(No Model.)
H. MUELLER.
TAPPING MACHINE.
No. 436,609. Patented Sept. 16, 1890.
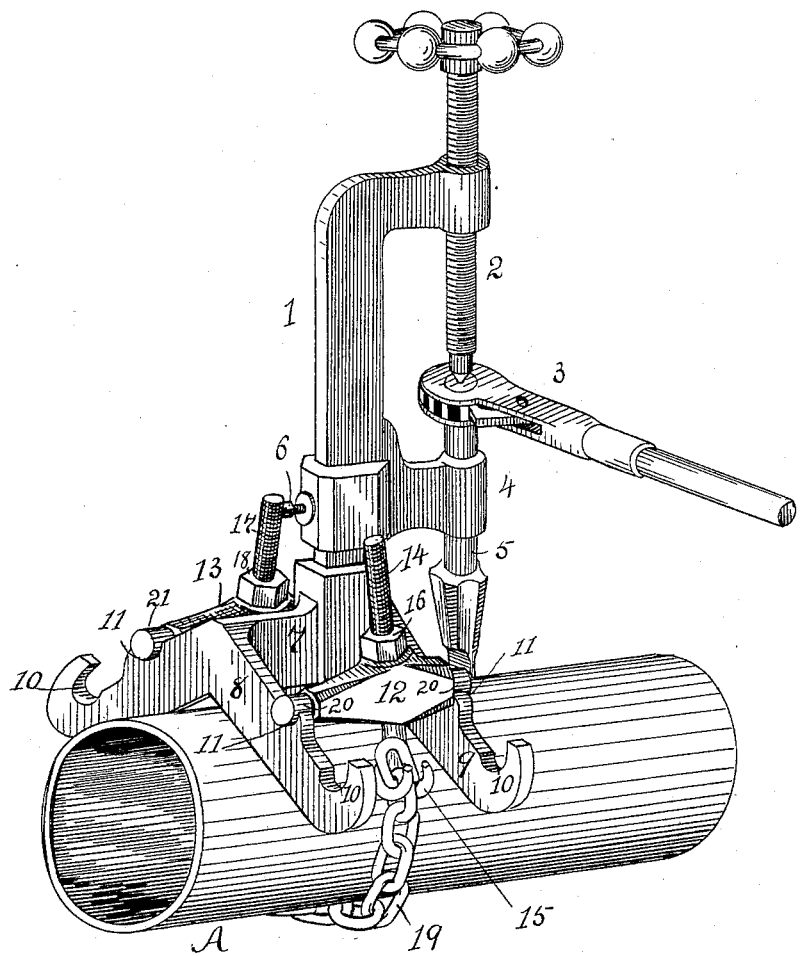
ATTEST
Helen Graham
W. W. Graham.
INVENTOR
H. Mueller.
By his attorney
L. P. Graham.

UNITED STATES PATENT OFFICE.

HIERONYMUS MUELLER, OF DECATUR, ILLINOIS.

TAPPING-MACHINE.

SPECIFICATION forming part of Letters Patent No. 436,609, dated September 16, 1890.

Application filed March 22, 1890. Serial No. 344,900. (No model.)

*To all whom it may concern:*

Be it known that I, HIERONYMUS MUELLER, of Decatur, in the county of Macon and State of Illinois, have invented certain new and useful Improvements in Tapping-Machines, of which the following is a specification.

This invention is designed to be used for dry-pipe tapping; and it consists in the details of construction and combinations of parts hereinafter set forth and claimed.

In the drawing accompanying and forming a part of this specification, A represents a section of pipe with my machine attached thereto. The standard 1 provides a bearing for the feed-screw 2, and it is rigidly secured to or integral with the saddle 7. Tool-guide 4 is mounted adjustably on the standard, and it carries the tapping-tool 5. It is held in any desired position on the standard by set-screw 6. The ratchet-lever 3 is connected with the upper end of the tool in the customary manner, and it provides means for intermittently rotating such tool. The saddle 7 has the end pieces 8 and 9, each extending laterally on both sides of the saddle and each having internal angles in their under surfaces. In the upper surfaces of bars or pieces 8 and 9 are sets of depressions 10 and 11, the one set at the ends of the bars and the other set more central. The function of the depressions is to provide bearings or journals for the trunnions 20 of block 12 and the trunnions 21 of block 13. The block 12 provides a transverse connection for bolt 14, and such bolt has the claw or hook termination 15 and is provided with the adjusting-nut 16. The bolt 17 in block 13 may be constructed the same as bolt 16, or it may have an eye at its lower end to which chain 19 may be permanently secured. It may be adjusted in the block 13 by means of nut 18.

In operation the saddle is set on a pipe, as indicated in the drawing. The trunnions of the blocks are placed in the inner or the outer bearings, according as the pipe is smaller or larger, the chain is passed under the pipe and caught on claw 19, the nuts are tightened until the machine is firmly secured to the pipe, and the tapping is effected in a readily-obvious manner.

The construction described enables firm attachment to be easily made to pipes of various sizes, and the attachment is of such nature as to successfully resist the displacing and detaching tendency of the operation of the tapping device.

I claim as new and desire to secure by Letters Patent—

In combination with the standard carrying the tapping-tool, the saddle having the internal angle in its under surface and the bearings in its upper surface, the blocks having the trunnions adapted to the bearings of the saddle, the adjustable bolts in the blocks, and the chains detachably connected with one or both bolts, as set forth.

In testimony whereof I sign my name in presence of two subscribing witnesses.

HIERONYMUS MUELLER.

Attest:
F. H. HALL,
C. W. MONTGOMERY.